United States Patent

[11] 3,582,236

| [72] | Inventor | Aaron J. Ungerer<br>Lakewood, Ohio |
|---|---|---|
| [21] | Appl. No. | 794,545 |
| [22] | Filed | Jan. 28, 1969 |
| [45] | Patented | June 1, 1971 |
| [73] | Assignee | The Standard Products Company<br>Cleveland, Ohio |

[54] CONTROL DEVICE RESPONSIVE TO LIQUID LEVEL
3 Claims, 6 Drawing Figs.

[52] U.S. Cl. .................................................... 417/211.5,
417/214
[51] Int. Cl. ...................................................... F04b 49/00
[50] Field of Search ........................................... 103/25, 23,
6, 38; 137/393; 417/211.5, 214

[56] References Cited
UNITED STATES PATENTS

| 730,465 | 6/1903 | Ladislaw et al. ............... | 417/211.5 |
| 2,094,171 | 9/1937 | Hoffer .......................... | 103/23X |
| 2,807,215 | 9/1957 | Hawxhurst .................... | 103/38 |
| 3,261,330 | 7/1966 | Arant ............................ | 103/9(X) |
| 3,363,641 | 1/1968 | Mylander ...................... | 137/393 |
| 3,380,467 | 4/1968 | Diehl, Jr. et al ............... | 103/6(X) |
| 3,457,865 | 7/1969 | Dunlap .......................... | 103/25 |

Primary Examiner—William L. Freeh
Attorney—Meyer, Tilberry and Body

ABSTRACT: A control device responsive to liquid level in a receptacle includes first and second reciprocating pumps. The first pump has an inlet communicating with a receptacle at a predetermined level. When liquid in the receptacle reaches the predetermined level, liquid is drawn into the first pump. The first pump communicates through a passageway with the chamber of the second pump. Liquid drawn into the first pump is expelled through the passageway and into the chamber of the second pump. The presence of liquid in the chamber of the second pump prevents full stroke operation of the second pump so that a control means connected with the reciprocating arm of the second pump is rendered inoperative when liquid is supplied to the chamber of the second pump.

PATENTED JUN 1 1971 3,582,236
SHEET 2 OF 2
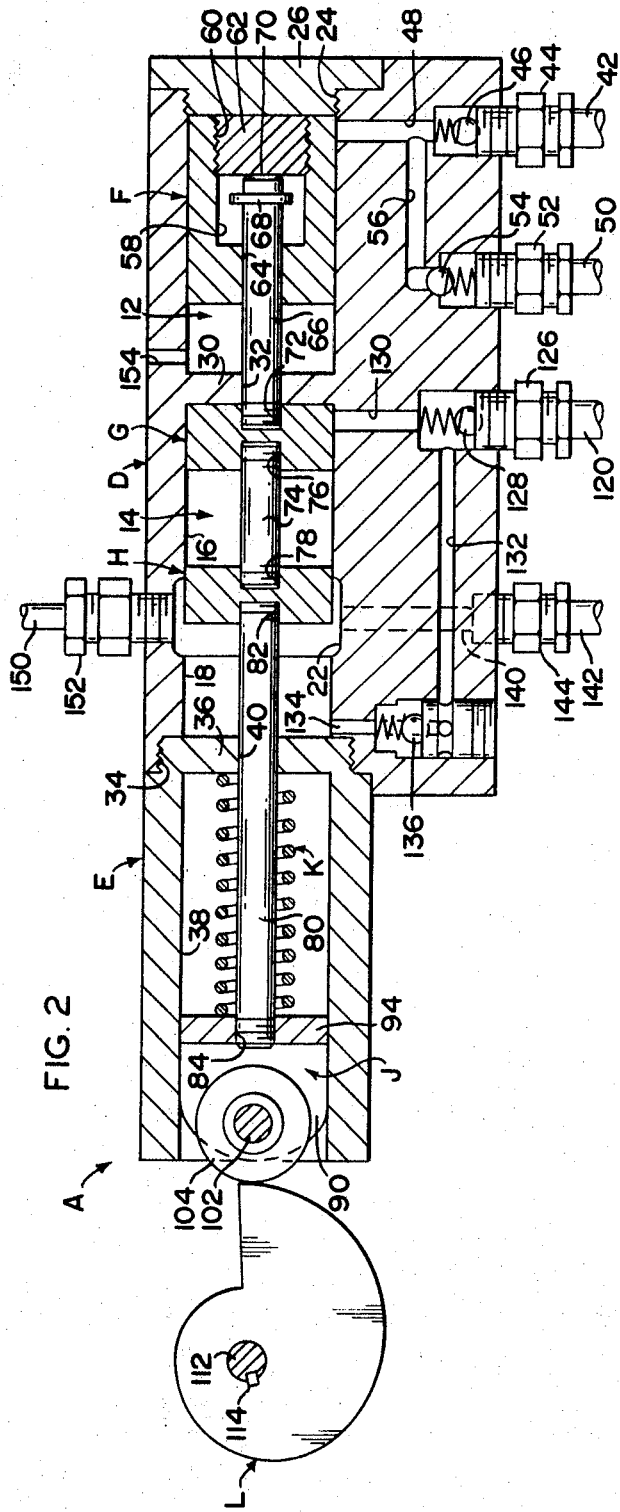
FIG. 2
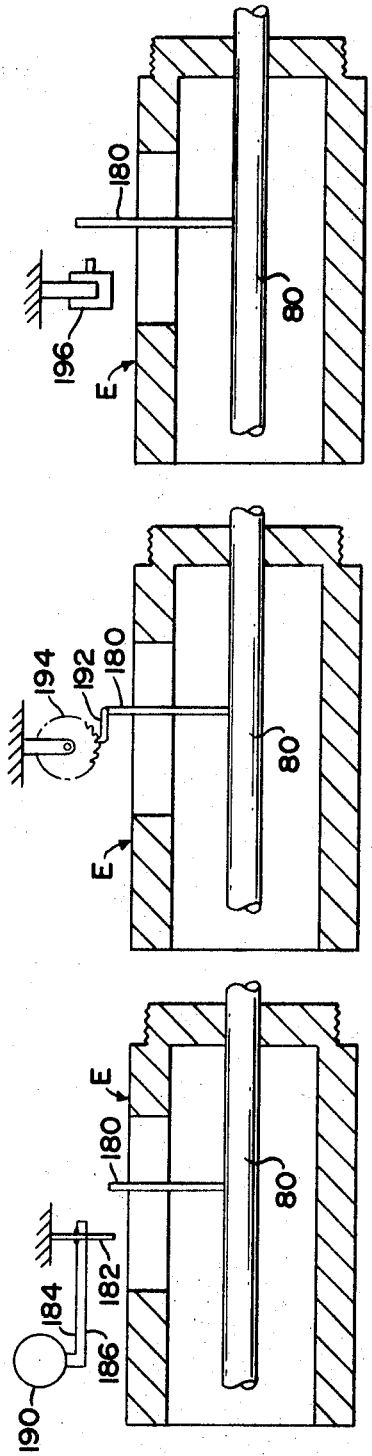
FIG. 6
FIG. 5
FIG. 4
INVENTOR.
AARON J. UNGERER
BY
Meyer, Tilberry & Body
ATTORNEYS.

CONTROL DEVICE RESPONSIVE TO LIQUID LEVEL

BACKGROUND OF THE INVENTION

This application pertains to the art of liquid level controls and more particularly to a device for maintaining a constant liquid level in a receptacle. The invention is particularly applicable to controlling a liquid level in a receptacle and will be described with particular reference thereto although it will be appreciated that the invention has broader applications and can also be used for controlling another device when liquid in a receptacle reaches a predetermined level.

In prior control devices responsive to a liquid level in a receptacle, a float or pressure responsive arrangement is often used. In float-type systems, a float member is floated on top of liquid in a receptacle and is mechanically connected to an actuating mechanism. When the liquid in the receptacle rises to a predetermined level, the float also reaches its preset level and actuates the mechanism which is connected to it. In pressure type systems, a closed receptacle has a closed tube connected to the receptacle and to a pressure switch. Rise of liquid in the receptacle raises the air pressure which is then transmitted through the tube to the pressure switch to perform a control operation. In such arrangements, vibration and large movement of the receptacle create false actuation of a control prematurely. For example, a movement of the receptacle will cause a surge of liquid from one end to the other. Such surges are often sensed by a float or by a pressure responsive arrangement as a false indication of the predetermined level having been reached. In addition, float-type arrangements require moving parts directly in the receptacle and it would be more desirable to have a level-sensing control arrangement remote from the receptacle. It would also be desirable to have a level responsive control which is not easily false actuated by surges of liquid in the receptacle. It would also be desirable to have a control arrangement in which actuation of a control device is very rapid when a predetermined liquid level is reached in the receptacle, and wherein return of the control device to its operative condition is very rapid once the liquid level drops below the predetermined level.

SUMMARY OF THE INVENTION

In accordance with the present invention, a control device is provided for maintaining a predetermined liquid level in a receptacle. The control device of the present invention is also useable for actuating a control device to shut down an operation when a predetermined level is reached in a receptacle.

More specifically, the device of the present invention includes a liquid-receiving means which is adapted to be in communication with a receptacle at a predetermined level. When liquid reaches a predetermined level in the receptacle, liquid is supplied to the receiving means and this operates a control means to a certain position. When liquid is absent from the receiving means, the control means is in a different operating position.

More specifically, the liquid-receiving means of the control device of the present invention includes first and second reciprocating pump means. The first pump means has a chamber communicating with a liquid receptacle and an outlet communicating with the chamber of the second pump. The pistons of the first and second reciprocating pumps are connected for movement together with opposite strokes. That is, when the first pump moves in a positive stroke direction the second pump moves in a negative stroke direction. Therefore, when liquid in the receptacle reaches a predetermined level and is drawn into the chamber of the first pump, such liquid is expelled from the first pump and into the second pump chamber where it then blocks return movement of the second pump piston. As long as liquid is at or slightly above the predetermined level, liquid will be supplied from the first pump to the second pump. As long as liquid is supplied to the second pump chamber, the piston of the second pump cannot return to its maximum positive stroke position. As long as the piston of the second pump cannot return to its maximum positive stroke position, a control means associated with the first and second pumps cannot be moved in an operating fashion.

In one arrangement, the control means comprises a third reciprocating pump which is connected for reciprocation with the first and second pumps. However, the connection from the first and second pumps to the third pump includes a lost motion so that the third pump is reciprocated only when the second pump is capable of making its full positive stroke. Therefore, when liquid is supplied to the second pump from the first pump to block the full positive stroke movement of the second pump, the third pump is rendered inoperative. In one arrangement, the third pump may be used for supplying liquid to the controlled level receptacle. In this manner, the third pump is rendered operative and inoperative to maintain a very accurate level in the receptacle. In other arrangements, the control device of the present invention may be suitably connected with other control means such as switches so that they will be actuated or deactuated in accordance with a predetermined level in a receptacle.

The control device of the present invention may be remotely positioned with respect to a receptacle and will still accurately control a liquid level in the receptacle with only a tubular connection between the receptacle and the control device. The device of the present invention is also very accurate because it is not highly subject to premature actuation due to surges of liquid in the receptacle.

It is a principle object of the present invention to provide a control device for sensing a predetermined level of liquid in a receptacle and for performing a control operation when the predetermined level is sensed.

It is a further object of the present invention to provide such a control device which may be remotely positioned with respect to a receptacle and is not highly subject to false premature actuation due to surges of liquid in the receptacle.

It is a further object of the present invention to provide such a control device for controlling operation of a main pump which supplies liquid to the receptacle in which it is desired to maintain a predetermined liquid level.

BRIEF DESCRIPTION OF THE DRAWING

The invention may take form in certain parts and arrangement of parts, a preferred embodiment of which will be described in detail in this specification and illustrated in the accompanying drawings.

FIG. 2 is the same side, elevational cross-sectional view as FIG. 1 but with the operative parts in a second position;

FIG. 3 is a cross-sectional elevational view taken on line 3–3 of FIG. 1;

FIG. 4 is a diagrammatic view showing a portion of the device of FIGS. 1 and 2 in combination with an alternative control means;

FIG. 5 is a diagrammatic view showing a portion of the device of FIGS. 1 and 2 in combination with an alternative control means; and FIG. 6 is a diagrammatic view showing a portion of the device of FIGS. 1 and 2 in combination with an alternative control means.

DESCRIPTION

Figure 1:
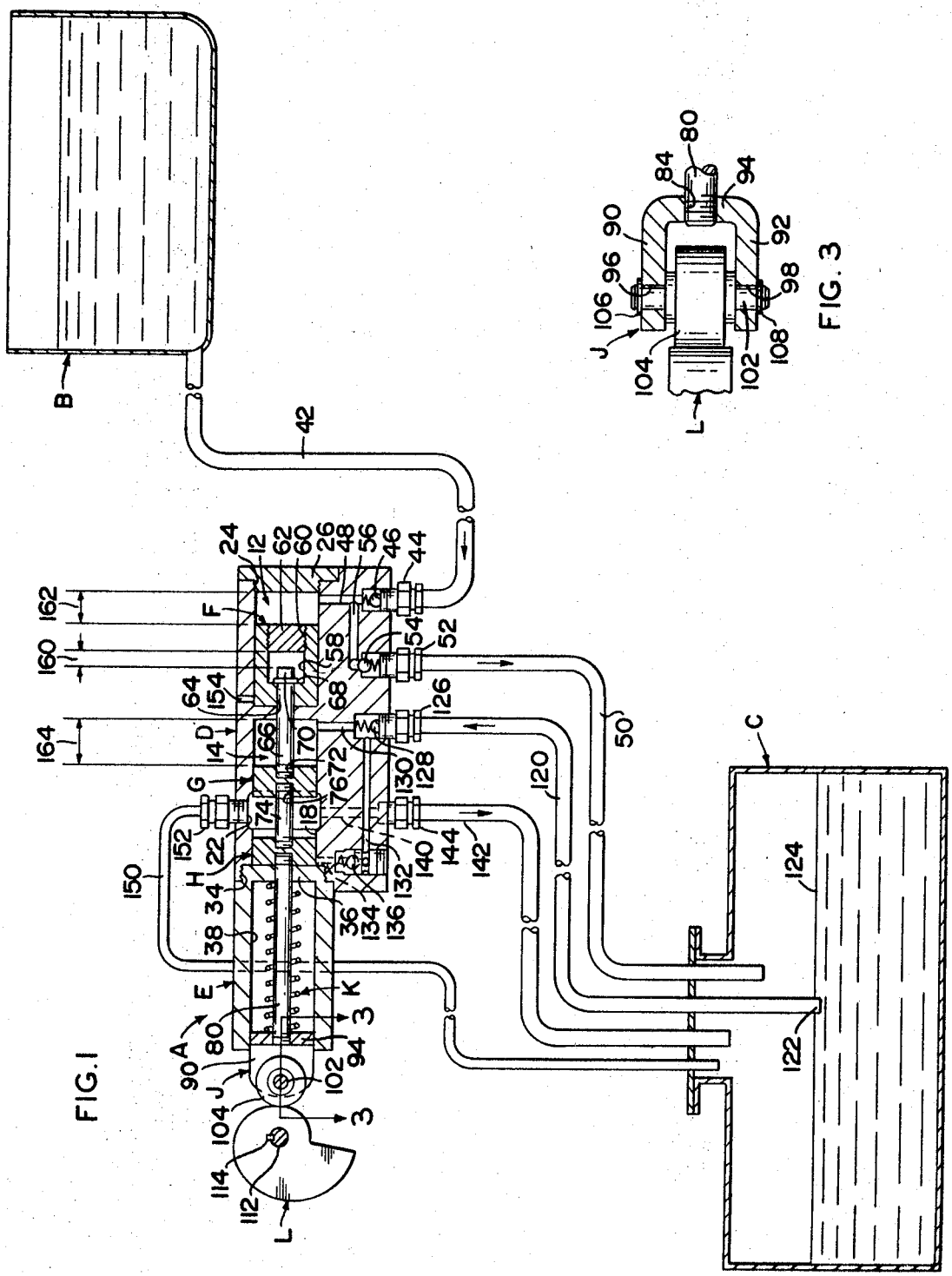
FIG. 1 is a side, elevational cross-sectional view of the control device of the present invention connected with a pair of receptacles.

Referring now to the drawings, wherein the showings are for purposes of illustrating the preferred embodiment of the invention only and not for purposes of limiting same, FIG. 1 shows control device A of the present invention connected with a pair of liquid-receiving receptacles B and C.

More specifically, control device A includes a body portion D having first and second cylindrical bores 12 and 14 therein. Cylindrical bore 14 includes first and second spaced-apart wall portions 16 and 18 of substantially the same diameter separated by a wall portion 22 of larger diameter than wall portions 16 and 18. The outer end of first cylindrical bore 12 has internal screw threads 24 formed therein for threadedly receiving a circular plug member 26 which closes the open outer end of first cylindrical bore 12. First and second cylindrical bores 12 and 14 are separated by a wall 30 having a centrally located circular hole 32 therethrough. The open outer end of second cylindrical bore 14 is provided with internal screw threads 34 for threadedly receiving end 36 of a second body member E which closes the open outer end of cylindrical bore 14. Second body member E is provided with an enlarged cylindrical bore 38, and end 36 has a centrally located circular hole 40 therethrough.

Receptacle B is connected to body member D through a tubular conduit 42 by a suitable threaded coupling 44 which includes a ball check valve 46. Tubular conduit 42 is in liquid flow communication through ball check valve 46 with a radial bore 48 in body member D. Bore 48 enters the forward end of cylindrical bore 12 and defines a liquid inlet for bore 12. Ball check valve 46 is operative to permit liquid flow from receptacle B, through conduit 42, past ball check valve 46, through bore 48 and into cylindrical bore 12. Ball check valve 46 is arranged to prevent reverse flow from cylindrical bore 12, through bore 48 and into conduit 42.

Another fluid conduit 50 communicates with the interior of receptacle C and is connected to body D by a suitable threaded coupling 52 which includes a ball check valve 54. A lateral bore 56 establishes liquid flow communication between bore 48 and conduit 50. In this flow line, ball check valve 54 is arranged to permit liquid flow from cylindrical bore 12, through bore 48, through lateral bore 56, past ball check valve 54, through conduit 50 and into receptacle C. Ball check valve 54 is arranged to prevent liquid flow in the reverse direction. That is, liquid cannot flow from conduit 50 past ball check 54 into cylindrical bore 12. It will be understood that lateral bore 56 may be defined by a pipe externally of body D if so desired.

Reciprocatingly positioned in cylindrical bore 12 is a piston F. Piston F includes an internal cylindrical bore 48 having internal threads 60 at its outer end for threadedly receiving a plug 62 which closes bore 58. The rear end of piston F is provided with a centrally located circular hole 64 through which a rod 66 slideably extends. A C-ring 68 is positioned in a circumferential groove on rod 66 within bore 58 of piston F to prevent withdrawal of rod 66 from hole 64. As shown in FIG. 1, end 70 of rod 66 is spaced a predetermined distance rearwardly of plug 62 when C-ring 68 is striking against the bottom end of cylindrical bore 58. Therefore, when rod 66 is moved axially to the right, as viewed in FIG. 1, end 70 of rod 66 must travel through the predetermined spacing distance before it strikes plug 62 for shifting piston F to the right toward plug 26 of bore 12. It will be evident that piston F defines a pump for drawing liquid into bore 12 from conduit 42 and expelling liquid from bore 12 through conduit 50. A sliding seal is preferably provided between hole 64 in piston F and rod 66. Rod 66 slideable extends through hole 32 in wall 30 and is threaded into a threaded recess 72 in piston G.

Another rod 74 has its ends threaded into threaded recesses 76 and 78 in pistons G and H. Another rod 80 slideably extends through hole 40 in body member E and is threaded into threaded recess 82 in piston H. The other end of rod 80 is threaded into a hole 84 in a bifurcated member J which is reciprocatingly positioned in cylindrical bore 38 of body member E. A coil spring K is positioned around rod 80 and has one end bearing against the bottom of bore 38 adjacent hole 40 in body member E, and its other end bearing against the bottom surface of bifurcated member J adjacent threaded hole 84. Coil spring K is arranged to normally bias bifurcated member J to the left as viewed in FIG. 1. It will be noted that the parts described define an entire assembly which reciprocates as a unit. Bifurcated member J is connected to rod 80 which in turn is connected to piston H, piston H is then connected to piston G through rod 78 and piston G is connected to piston F through rod 66. This entire assembly reciprocates as a unit when bifurcated member J is reciprocated within bore 38 of body member E. In a preferred arrangement, the spacing for lost motion between end 70 of rod 66 and plug 62 is such that piston F reciprocates through a stroke only one-half as great as the stroke of pistons G and H.

It will be understood that control device A is rigidly mounted on a support by any suitable bracket means such as brackets welded or otherwise secured to body portions D and E, and bolted to a supporting surface. Bifurcated member J may be defined by a pair of spaced-apart arms 90 and 92 which are interconnected by a bottom leg 94 in which threaded hole 84 is formed. Holes 96 and 98 in arms 90 and 92 receive an axle 102 on which a roller 104 is rotatably mounted between arms 90 and 92. Axle 102 may be retained in position by C-rings 106 and 108 received in circumferential grooves in axle 102.

As shown in FIG. 1, a cam L is fixed on a rotatable shaft 112 as by a key 114. Shaft 112 may be rotatably driven about its longitudinal axis by any suitable power source such as an electric motor. With pistons F, G and H in their maximum leftward movement as viewed in FIG. 1, roller 104 is positioned against the low point of cam L. As cam L is rotated clockwise as viewed in FIG. 1, roller 104 and bifurcated member J will be moved axially to the right within bore 38 of body member E. This in turn will move pistons F, G and H to the right by means of innerconnecting rods 66, 74 and 80. Cam member L is preferably ranged so that the maximum movement of roller 104 in bifurcated member J to the right will cause piston F to be positioned substantially against plug 26 and will cause piston G to be positioned substantially against wall 30. As cam L continues clockwise rotation, roller 104 will eventually reach cam drop off 116 and will once again be reciprocated to the left against the low point of the cam by spring K. This movement will also bring the other parts back to the position shown in FIG. 1. It will be obvious to those skilled in the art that the assembly may be reciprocated by means other than a cam, such as a crank or reciprocating motor, and that spring K may act in a reverse direction so as to shift the parts to the right as viewed in FIG. 1 with cam L carrying the parts back to the left against the bias of spring K.

A fluid conduit 120 communicates with the interior of receptacle C and has its end 122 positioned at a desired liquid level 124 within receptacle C. In a preferred arrangement, conduit 120 is vertically adjustable relative to receptacle C so that end 122 may be positioned at any number of desired predetermined levels 124. Conduit 120 is connected to body D by a suitable threaded coupling 126 which includes a check valve 128. A bore 130 in body D enters the forward end of cylindrical bore 16 and communicates with conduit 120 through check valve 128. Ball check valve 128 is arranged to permit liquid flow from receptacle C, through conduit 120, through ball check valve 128, through bore 130 and into bore 16. Ball check valve 128 is arranged to prevent liquid flow in a reverse direction from bore 16 to conduit 120. A lateral passage 132 connects bore 130 with another bore 134 through check valve 136. Bore 134 enters the extreme left end of bore 18 to the rear of piston H. Ball check valve 136 is arranged to permit liquid flow from bore 16, through bore 130, through passageway 132, past ball check valve 136, through bore 134 and into bore 18 as piston H is moved to the right. Ball check valve 136 prevents reverse flow of liquid from bore 18 to passageway 132.

Enlarged diameter portion 22 of bore 14 communicates with a bore 140 formed through the bottom of body D. A fluid conduit 142 communicates with the interior of receptacle C and is suitably connected to body D for liquid flow communication with bore 140 by threaded coupling 144. An additional conduit 150 communicates with enlarged diameter portion 22 through a suitable threaded coupling 152. Conduit 150 may simply be opened to atmosphere or may be connected with the interior of receptacle C to equalize the pressure between pistons G and H when receptacle C is pressurized. In addition, a small opening 154 vents the bottom end of bore 12 to atmosphere so that piston F is freely movable within bore 12. It will be understood that lateral passageway 132, and check valve 136, may be provided in conduits exteriorly of body D and suitably connected to body D by threaded couplings for communication with bores 130 and 134.

As shown in FIG. 1, end 70 of rod 66 has a lost motion movement of a distance 160 before striking plug 62 on piston F. Piston F then moves a distance 162 during its positive and negative working strokes. Pistons G and H both travel a distance 164 in their full positive and negative strokes. In one arrangement, lost motion distance 160 may be around the same, or a little less, than full stroke distance 164 for pistons G and H. Working stroke distance 162 for piston F will then be the difference between distance 164 and distance 160.

With the parts arranged as shown in FIG. 1, cam L may be started rotating clockwise. Pistons F, G and H will then move from their maximum leftward position as shown in FIG. 1 when roller 104 is against the low point of cam L, to a maximum rightward position as shown in FIG. 2 when roller 104 is at the high point of cam L. This action is continued and pistons F, G and H continuously reciprocate between the positions shown in FIGS. 1 and 2. Piston F will work as a pump and reciprocate back and forth through distance 162 to pump liquid from receptacle B to receptacle C. As long as liquid level 124 is below end 122 of conduit 120, no liquid will be drawn into bore 16 by piston G. The maximum rightward movement of piston H, as shown in FIG. 2, opens bore 18 to communication with large diameter portion 22 around the periphery of piston H. Therefore, any air pumped by piston G to the rear of piston H within bore 18 is rapidly exhausted through bore 140 in conduit 150. During leftward movement of piston H, from the position shown in FIG. 2 to the position shown in FIG. 1, any air pumped by piston G to the rear of piston H in bore 18 will be rapidly expelled through conduits 142 and 150 so that air cannot be pressurized to the left of piston H and prevent its return movement to the position shown in FIG. 1 from that shown in FIG. 2. Any air remaining within bore 18 as piston H moves to its left will be compressed and because air is highly compressible it will not interfere with leftward movement of piston H to substantially its maximum leftward position as shown in FIG. 1.

When the liquid level in receptacle C reaches predetermined level 124, liquid will be drawn through conduit 120 and into bore 16 by leftward movement of piston G. This liquid will then be pumped out of chamber 16 and into chamber 18 to the rear of piston H. As piston H reaches its maximum rightward position as shown in FIG. 2, some of this liquid will flow around the bottom periphery of piston H and into enlarged diameter portion 22 where it will drain through bore 140 in conduit 142. However, the leakage clearance around piston H into enlarged diameter portion 22, and the size of bore 140 is such that all of the liquid cannot drain from the rear of piston H prior to its movement back to the left. As liquid continues to be supplied from bore 16 by piston G to the rear of piston H in bore 18, the amount of liquid to the rear of piston H will gradually build up until piston H can no longer move to the left when it begins to enter bore 18. As long as liquid is supplied to the rear of piston H this condition will prevail. The amount of stroke distance of piston H which is blocked by the liquid is substantially the same as stroke distance 162 of piston F. This allows piston H to move only through lost motion stroke distance 160. Therefore, once liquid is supplied to chamber 18 to the rear of piston H, piston F will remain in its maximum rightward position as shown in FIG. 2 and rod 66 will simply reciprocate through lost motion distance 160 so that liquid will no longer flow from receptacle B to receptacle C.

Receptacle C may have a critical orifice through which liquid flows at a predetermined rate as established by the pressure head determined by level 124. Thus, when level 124 starts to rise above its predetermined level due to supply of liquid from receptacle B to receptacle C at a faster rate then liquid is draining from receptacle B, there would be a tendency for the flow rate out of receptacle C to increase due to the increased head. However, the blocking action described will stop operation of piston F to keep level 124 at its desired position. Once level 124 begins to drop below end 122 of conduit 120, liquid will no longer be supplied to chamber 16 by action of piston G. When this happens, each rightward movement of piston H to the position shown in FIG. 2 will cause some of the liquid to the rear of piston H to be drained around the periphery of piston H and out through bore 140. As long as no further liquid is supplied from chamber 16 by piston G to the rear of piston H, the liquid to the rear of piston H will eventually completely drain away through bore 140. As liquid is drained away from the rear of piston H, piston H will once again begin reciprocating a greater stroke distance. This distance will gradually increase and become increasingly greater than lost motion distance 160 so that piston F will again be gradually reciprocated and supply liquid to receptacle C from receptacle B. Eventually, all of the liquid to the rear of piston H will be drained away and piston F will again reciprocate its maximum stroke distance 162 from its extreme leftward position as shown in FIG. 1 to its extreme rightward position as shown in FIG. 2. If level 124 again rises above its desired predetermined level, liquid will again be supplied to bore 16 and the blocking action will again occur. It should be noted that the blocking action of piston F is gradual in both stopping its pumping movement and in once again starting its pumping movement. That is, liquid is gradually supplied to the rear of piston H so that the stroke of piston F is gradually reduced. This reduces the rate at which liquid is being supplied from receptacle B to receptacle C and makes it possible to accurately maintain a predetermined desired level 124. In addition, once movement of piston F is entirely stopped and then started again, the stroke will gradually increase as liquid is slowly drained from the rear of piston H. It will also be understood that suitable sliding seals are proved between rod 80 and hole 40, and between rod 66 and hole 32. It is also obvious that other pump arrangements could be provided such as diaphragm or bellows-type pumps.

It will be evident that surges of liquid in receptacle C may cause some liquid to be drawn into chamber 16 but it will be insufficient to stop operation of piston F. This contrasts with a float or pressure switch in which a surge may actuate the control means due to the false signal.

Other control means may be substituted for piston F or provided on device A in combination with piston F. For example, FIG. 4 shows a lateral extension 180 on rod 80 extending through a suitable elongated slot in body E. Lateral extension 180 will reciprocate with rod 80 and will normally travel through the same distance 164 as pistons G and H. A piezoelectric crystal 182 may be positioned to be bent by extension 180 as extension 180 moves through the last half of its leftward movement as represented by lost motion distance 160 in FIG. 1. As long as predetermined liquid level 124 remains at, or below, the desired level, rod 80 and extension 180 will be reciprocated through its maximum stroke to bend piezoelectric crystal 182 and send voltage signals through wires 184 and 186 to a responsive device 190 such as a buzzer which gives audible evidence that the unit is pumping or to a solenoid valve controlling liquid supply to receptacle B. Once liquid reaches predetermined level 124 or rises slightly above, liquid will be supplied to bore 16 by movement of piston G which in turn will supply liquid to the rear of piston H in bore 18. This will block leftward movement of lateral extension 180 to its maximum leftward position and will no longer cause piezoelectric crystal 182 to be bent for sending the voltage signals to responsive device 190.

FIG. 5 shows another arrangement in which lateral extension 180 includes a pawl 192 arranged for driving contact with a ratchet wheel 194 during the last half of the leftward stroke of extension 180. When leftward movement of lateral extension 180 is blocked for the last half of its leftward stroke, pawl 192 will no longer drive ratchet wheel 194. Ratchet wheel 194 may be connected with any other suitable control mechanism such as a counter for counting the number of pumping strokes of piston F over a period of time.

FIG. 6 shows an arrangement in which lateral extension 180 on rod 80 actuates a push-push reversing switch 196 during the last half of the leftward stroke of extension 180. Blocking movement of extension 180 so that it cannot move leftward during the last half of its stroke prevents actuation of push-push switch 196. Push-push switch 196 may reverse connections to a reversible electric motor which may have a mixer attached to its shaft and positioned in receptacle B or C for agitating the contents. In another arrangement, switch 196 may be replaced by a lever of a mechanical metering device for metering pigment or other material into the liquid in receptacle C. In such an arrangement, as long as liquid is flowing into and out of receptacle C at a constant rate, as determined by maintaining level 124 constant at the predetermined level, material is added to receptacle C through the metering device in each leftward stroke of extension 180. However, blocking the last half of the leftward stroke of extension 180 will stop operation of the metering device so that the concentration of the additive in the liquid in receptacle C will not rise above a desired level when operation of piston F is stopped. It is also contemplated that a contact or pressure switch may be provided forwardly of piston F so that it would be actuated every time piston F is moved to the right as viewed in FIG. 1 and would not be actuated when movement of piston F is stopped in the manner previously described.

It will be evident from the previous description that bores 16 and 18, along with piston G and H, define a receiving means for liquid from receptacle C and that piston F defines a control means which is placed in an operative state when no liquid is supplied to the receiving means, and which is placed in an inoperative state when liquid is supplied to the receiving means. The receiving means defines part of a level-sensing device which accurately controls a control means in accordance with a predetermined liquid level in a receptacle.

While the invention has been described with reference to a preferred embodiment, it is obvious that modifications and alterations will occur to others upon the reading and understanding of this specification.

Having thus described my invention, I claim:

1. In a liquid transfer device including conduit means through which liquid flows from a first position to a second position and flow control means for selectively starting and stopping liquid flow through said conduit means, the improvement comprising;
   a. level-sensing means communicating with said second position for sensing a predetermined liquid level at said second position.
   b. connecting means connecting said level-sensing means with said flow control means,
   c. said level-sensing means including liquid-receiving means and liquid transfer means for transferring liquid at said predetermined level from said second position to said receiving means,
   d. drain means for draining liquid from said receiving means when the liquid level at said second position drops below said predetermined level,
   e. said level-sensing means cooperating with said flow control means upon reception of liquid in said receiving means to stop liquid flow through said conduit,
   f. said level-sensing means cooperating with said flow control means in the absence of liquid in said receiving means to start liquid flow through said conduit,
   g. said receiving means including first and second chambers,
   h. pressure means cooperating with said first chamber for alternately creating positive and negative pressure in said first chamber, and
   i. said first chamber communicating with said liquid transfer means when under negative pressure and communicating with said second chamber when under positive pressure.

2. A control device comprising; first and second reciprocating pump means, each of said pump means having a negative pressure stroke and a positive pressure stroke, said first pump means having an inlet, passageway means connecting said first pump means with said second pump means, said passageway means defining an outlet for said first pump means and an inlet for said second pump means, said first and second pump means being connected for reciprocation together, said first pump means moving in a negative stroke when said second pump means moves in a positive stroke and moving in a positive stroke when said second pump means moves in a negative stroke, said second pump means being movable between a first position defining a maximum positive stroke position and a second position defining a maximum negative stroke position, said second pump means having drain means between said first and second positions for draining liquid from said second pump means on the negative stroke thereof, said second pump means reciprocating a first stroke distance from said first position to said drain means and a second stroke distance from said drain means to said second position, said second pump means being rendered inoperative to move through said first stroke distance in a positive stroke direction upon supply of liquid from said first pump means to said second pump means.

3. The device of claim 2 and further including third reciprocating pump means connected by lost motion means for reciprocation with said first and second pump means, said lost motion means requiring movement of said second pump means through said first stroke distance in positive and negative stroke directions to effect reciprocation of said third pump means.